United States Patent
Caprioli et al.

(10) Patent No.: US 7,617,421 B2
(45) Date of Patent: Nov. 10, 2009

(54) METHOD AND APPARATUS FOR REPORTING FAILURE CONDITIONS DURING TRANSACTIONAL EXECUTION

(75) Inventors: Paul Caprioli, Santa Clara, CA (US); Sherman H. Yip, San Francisco, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 491 days.

(21) Appl. No.: 11/495,452

(22) Filed: Jul. 27, 2006

(65) Prior Publication Data

US 2008/0126883 A1 May 29, 2008

(51) Int. Cl.
*G06F 11/00* (2006.01)
(52) U.S. Cl. .......................................... 714/49; 714/16
(58) Field of Classification Search .................... 714/16, 714/45, 49
See application file for complete search history.

(56) References Cited

U.S. PATENT DOCUMENTS

| | | | | |
|---|---|---|---|---|
| 5,751,942 A * | 5/1998 | Christensen et al. | ......... | 714/38 |
| 5,752,013 A * | 5/1998 | Christensen et al. | ......... | 712/227 |
| 5,850,507 A * | 12/1998 | Ngai et al. | ......... | 714/16 |
| 6,026,503 A * | 2/2000 | Gutgold et al. | ......... | 714/45 |
| 6,055,648 A * | 4/2000 | Tokuyama et al. | ......... | 714/16 |
| 6,094,729 A * | 7/2000 | Mann | ......... | 714/25 |
| 6,182,241 B1 * | 1/2001 | Ngai et al. | ......... | 714/16 |
| 6,363,401 B2 * | 3/2002 | Yahya et al. | ......... | 707/202 |
| 6,643,797 B1 * | 11/2003 | Horowitz | ......... | 714/20 |
| 6,647,510 B1 * | 11/2003 | Ganesh et al. | ......... | 714/16 |
| 6,820,216 B2 * | 11/2004 | Cmelik et al. | ......... | 714/15 |
| 6,862,664 B2 | 3/2005 | Tremblay et al. | ......... | 711/137 |
| 7,103,008 B2 * | 9/2006 | Greenblat et al. | ......... | 370/258 |
| 7,124,284 B2 * | 10/2006 | Sugumar et al. | ......... | 712/218 |
| 7,350,110 B2 * | 3/2008 | DeWitt et al. | ......... | 714/35 |
| 7,457,984 B2 * | 11/2008 | Kutan et al. | ......... | 714/18 |
| 2004/0039962 A1 * | 2/2004 | Ganesh et al. | ......... | 714/16 |
| 2004/0133769 A1 * | 7/2004 | Chaudhry et al. | ......... | 712/233 |
| 2004/0162948 A1 * | 8/2004 | Tremblay et al. | ......... | 711/137 |
| 2004/0162951 A1 * | 8/2004 | Jacobson et al. | ......... | 711/143 |
| 2004/0162967 A1 * | 8/2004 | Tremblay et al. | ......... | 712/228 |
| 2004/0162968 A1 * | 8/2004 | Tremblay et al. | ......... | 712/228 |
| 2005/0154811 A1 * | 7/2005 | DeWitt et al. | ......... | 710/260 |
| 2007/0101192 A1 * | 5/2007 | Kutan et al. | ......... | 714/16 |
| 2007/0226545 A1 * | 9/2007 | Chen | ......... | 714/45 |
| 2008/0022045 A1 * | 1/2008 | Ali et al. | ......... | 711/125 |

* cited by examiner

*Primary Examiner*—Robert Beausoliel
*Assistant Examiner*—Joshua P Lottich
(74) *Attorney, Agent, or Firm*—Park, Vaughan & Fleming LLP (57) ABSTRACT

One embodiment of the present invention provides a system that reports reasons for failure during transactional execution. During operation, the system transactionally executes a block of instructions in a program. If the transactional execution of the block of instructions completes successfully, the system commits changes made during the transactional execution, and resumes normal non-transactional execution of the program past the block of instructions. Otherwise, if transactional execution of the block of instructions fails, the system discards changes made during the transactional execution, and records failure information indicating why the transactional execution failed.

18 Claims, 7 Drawing Sheets

FIG. 1

| OLD VERSION | NEW VERSION | |
|---|---|---|
| ⋮ | ⋮ | |
| ACQUIRE LOCK | STE | \<FAIL PC\> |
| ⋮ | ⋮ | |
| CRITICAL SECTION ⟹ | CRITICAL SECTION | |
| ⋮ | ⋮ | |
| RELEASE LOCK | COMMIT | |
| ⋮ | ⋮ | |

METHOD AND APPARATUS FOR REPORTING FAILURE CONDITIONS DURING TRANSACTIONAL EXECUTION

RELATED APPLICATIONS

This application is related to non-provisional U.S. patent application Ser. No. 10/637,166, filed on 8 Aug. 2003, entitled "Start Transactional Execution (STE) Instruction to Support Transactional Program Execution," by inventors Marc Tremblay, Quinn A. Jacobson and Shailender Chaudhry. This application is also related to a non-provisional U.S. patent application Ser. No. 10/637,165, filed on 8 Aug. 2003, "Commit Instruction to Support Transactional Program Execution," by inventors Shailender Chaudhry Marc Tremblay and Quinn A. Jacobson. This application is also related to a non-provisional U.S. patent application Ser. No. 10/637,169, filed on 8 Aug. 2003, entitled "Fail Instruction to Support Transactional Program Execution," by inventors Shailender Chaudhry Marc Tremblay and Quinn A. Jacobson.

BACKGROUND

1. Field of the Invention

The present invention relates to techniques for facilitating transactional program execution. More specifically, the present invention relates to a method and an apparatus for reporting reasons for failure during transactional program execution.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use of locks. A lock is typically acquired before a thread enters a critical section of code, and is released after the thread exits the critical section. If another thread wants to enter a critical section protected by the same lock, it must acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modem microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure. It also introduces significant software engineering concerns, such as avoiding deadlock.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Consequently, in these cases, the overhead involved in acquiring and releasing locks is largely wasted.

Computer designers have alleviated this problem by providing mechanisms to "transactionally execute" critical sections of code. If transactional execution of a critical section completes successfully without interference from another process, the system commits changes made during the transactional execution, and resumes normal execution of the program past the critical section. Otherwise, if transactional execution of the critical section fails because of interference from another process, the system discards changes made during the transactional execution. (For example, see U.S. Pat. No. 6,862,664, entitled "Method and Apparatus for Avoiding Locks by Speculatively Executing Critical Sections of Code" by inventors Shailender Chaudhry and Marc Tremblay and Quinn A. Jacobson.)

In a computer system that supports transactional execution, it is desirable to know why an attempted transaction failed. This allows the system to determine whether it is beneficial to re-attempt the transaction, or instead to acquire a lock on the critical section. However, existing transactional memory implementations provide no mechanism for recording this type of failure information.

Hence, what is needed is a method and an apparatus for reporting reasons for failure during transactional program execution.

SUMMARY

One embodiment of the present invention provides a system that reports reasons for failure during transactional execution. During operation, the system transactionally executes a block of instructions in a program. If the transactional execution of the block of instructions completes successfully, the system commits changes made during the transactional execution, and resumes normal non-transactional execution of the program past the block of instructions. Otherwise, if transactional execution of the block of instructions fails, the system discards changes made during the transactional execution, and records failure information indicating why the transactional execution failed.

In a variation on this embodiment, if transactional execution of the block of instructions fails, the system resumes execution at an address which is specified by an instruction which started the transactional execution of the block of instructions.

In a variation on this embodiment, if transactional execution of the block of instructions fails, the system also determines from the recorded failure information whether it is advantageous to re-execute the block of instructions. If so, the system re-executes the block of instructions.

In a variation on this embodiment, the system records the failure information in a transaction-status register (TSR).

In a further variation, information contained in the TSR specifies whether recording of the failure information has been disabled or is not supported by the processor.

In a variation on this embodiment, the failure information is recorded whenever a pipe clear operation occurs on the processor. In this embodiment, the failure information contains an "exogenous flag," which indicates whether the information was recorded during transactional execution or during execution of "exogenous code" from outside of transactional program execution.

In a variation on this embodiment, the failure information includes: a flag indicating that a coherency violation caused the transactional execution to fail, wherein the coherency violation indicates that another process interfered with the transactional execution; a flag indicating whether a fail instruction caused the transactional execution to fail; a flag indicating whether an instruction disallowed during transactional execution caused the transactional execution to fail; a flag indicating whether a precise trap caused the transactional execution to fail; a flag indicating whether an asynchronous trap caused the transactional execution to fail; a flag indicating whether a deferred-queue-full condition caused the transactional execution to fail; a flag indicating whether a load instruction caused the transactional execution to fail; a flag indicating whether a store instruction caused the transactional execution to fail; a flag indicating whether a control-transfer instruction (CTI) caused the transactional execution to fail; and a flag indicating whether a floating-point instruction caused the transactional execution to fail.

In a further variation, the fail instruction is a variation of a trap instruction which causes the transactional execution to fail.

Table 1 presents exemplary code for executing a critical section in accordance with an embodiment of the present invention.

Table 2 presents exemplary code for an alternate path in accordance with an embodiment of the present invention.

Table 3 presents exemplary code for setting a transaction status register (TSR) in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
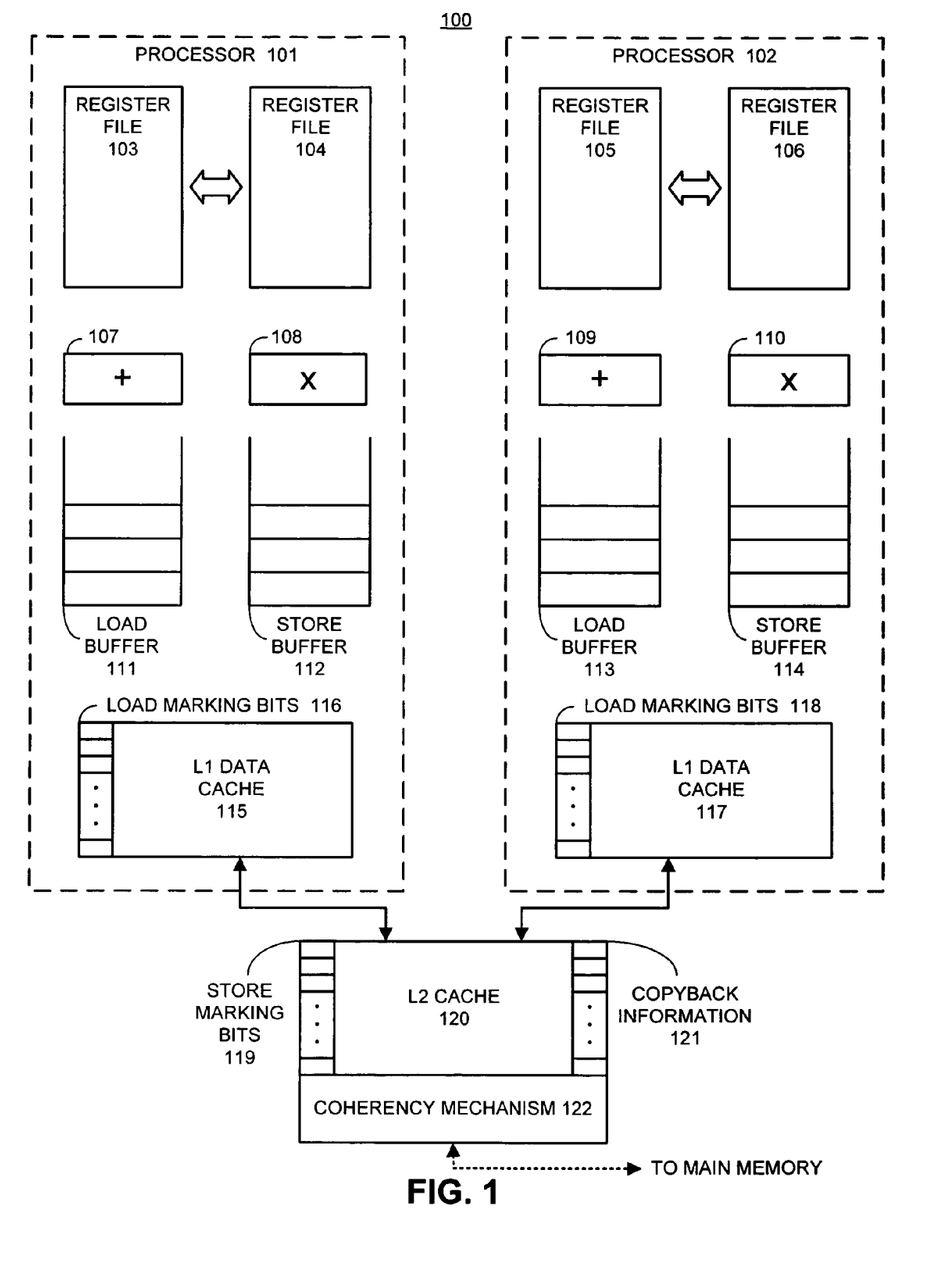
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register check-pointing operation to support transactional execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that lines in L1 data cache 115 include load-marking bits 116, which indicate that a data value from the line has been loaded during transactional execution. These load-marking bits 116 are used to determine whether any interfering memory references take place during transactional execution as is described below with reference to FIGS. 3-8. Processor 101 also includes an L1 instruction cache (not shown).

Note that load-marking does not necessarily have to take place in L1 data cache 115. In general load-marking can take place at any level cache, such as L2 cache 120, or even in an independent structure. However, for performance reasons, the load-marking will likely take place at the cache level that is as close to the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where a cache line must be sent to another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3-8. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, we perform store-marking in the L1 data cache. (Note that the cache coherence protocol ensures that any other processor that subsequently modifies the same cache line will retrieve the cache line from the L1 cache, and will hence become aware of the store-mark.)

Executing a Critical Section

Figure 2A:
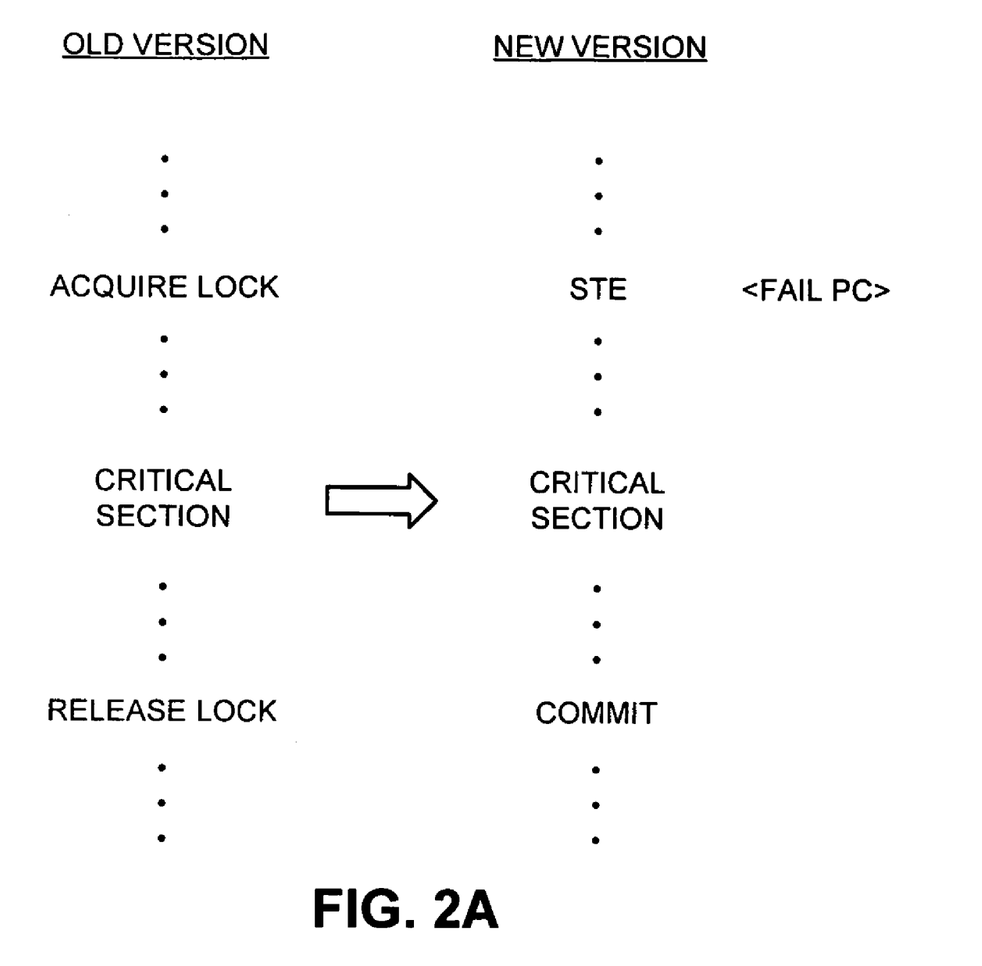
FIG. 2A illustrates how a critical section is executed in accordance with an embodiment of the present invention.

FIG. 2A illustrates how a critical section is executed in accordance with an embodiment of the present invention. As is illustrated in the left-hand side of FIG. 2A, a thread that executes a critical section typically acquires a lock associated with the critical section before entering the critical section. If the lock has been acquired by another thread, the thread may have to wait until the other thread releases the lock. Upon leaving the critical section, the thread releases the lock. (Note that the terms "thread" and "process" are used interchangeably throughout this specification.)

A lock can be associated with a shared data structure. For example, before accessing a shared data structure, a thread can acquire a lock on the shared data structure. The thread can then execute a critical section of code that accesses the shared data structure. After the thread is finished accessing the shared data structure, the thread releases the lock.

In contrast, in the present invention, the thread does not acquire a lock, but instead executes a start transactional execution (STE) instruction before entering the critical section. If the critical section is successfully completed without interference from other threads, the thread performs a commit operation, to commit changes made during transactional execution. This sequence of events is described in more detail below with reference to FIGS. 3-8.

Note that in one embodiment of the present invention a compiler replaces lock-acquiring instructions with STE instructions, and also replaces corresponding lock releasing instructions with commit instructions. Note that there may not be a one-to-one correspondence between replaced instructions. For example, a single lock acquisition operation comprised of multiple instructions may be replaced by a single STE instruction.

Figure 2B:
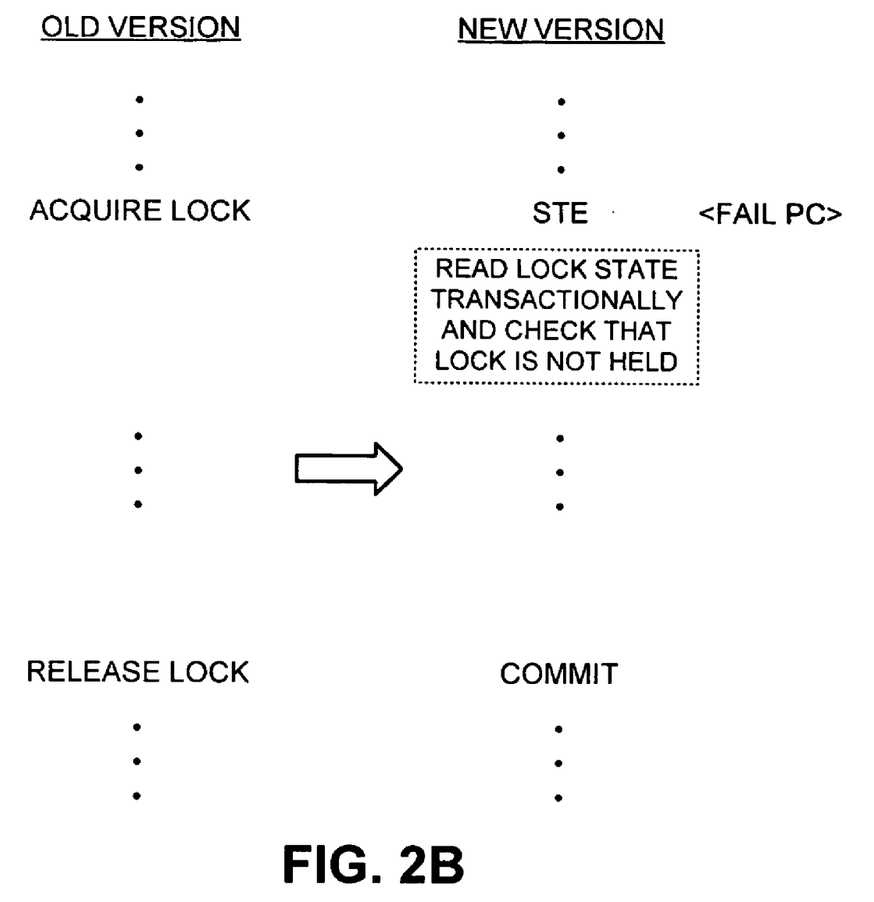
FIG. 2B illustrates another example of how a critical section is executed in accordance with an embodiment of the present invention.

Note that in many cases we will want to maintain the ability to fall back on the lock in case we cannot make progress for some reason. Also, from a software engineering standpoint, it will often be desirable to transform the code only in common paths, and leave locking code intact in uncommon paths. To facilitate this, in transforming a critical section to execute transactionally, we can replace the lock-acquire with an STE instruction followed by code that reads the lock state transactionally and checks that the lock is not held (see FIG. 2B).

The above discussion presumes that the processor's instruction set has been augmented to include an STE instruction and a commit instruction. These instructions are described in more detail below with reference to FIGS. 3-;9.

Transactional Execution Process

Figure 3:
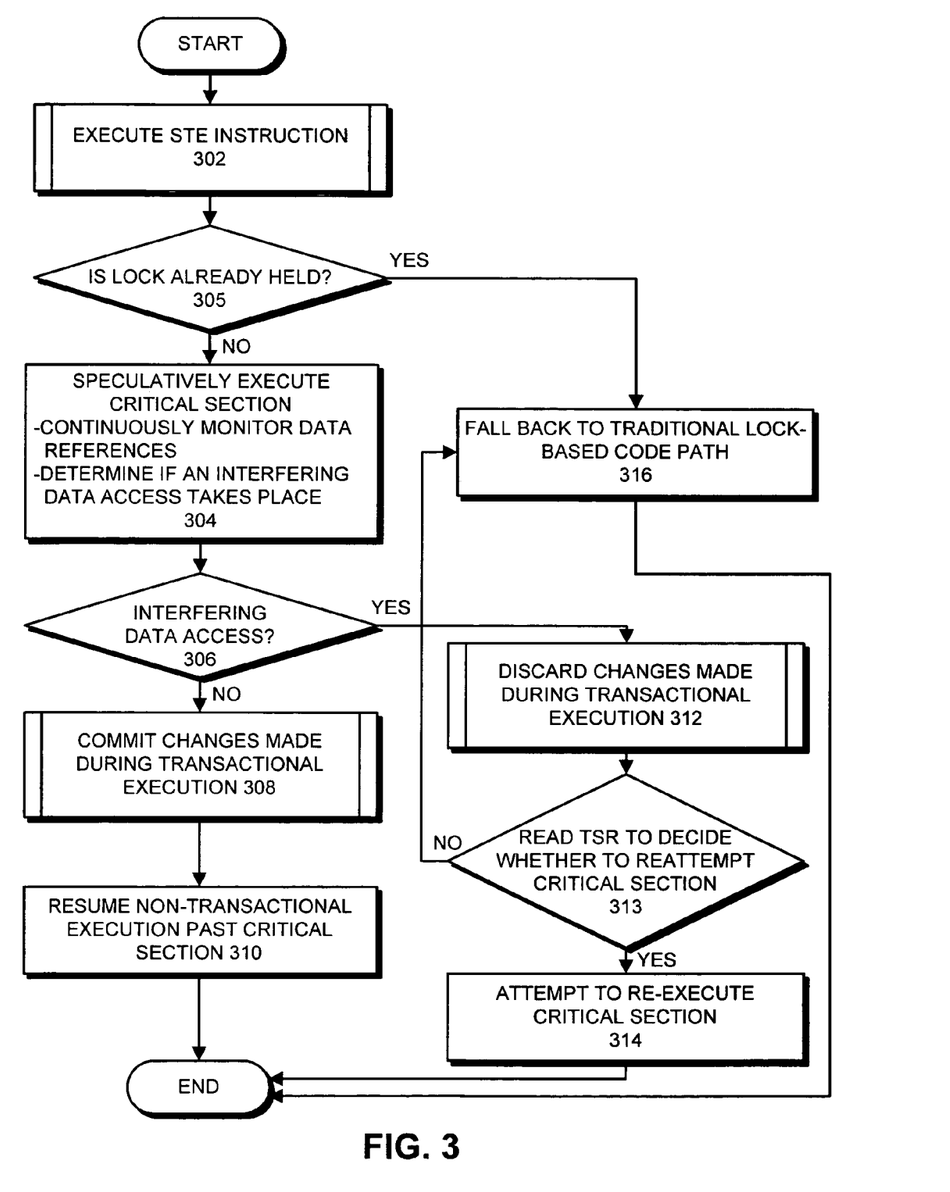
FIG. 3 presents a flow chart illustrating the transactional execution process in accordance with an embodiment of the present invention.

FIG. 3 presents a flow chart illustrating how transactional execution takes place in accordance with an embodiment of the present invention. A thread first executes an STE instruction prior to entering of a critical section of code (step 302). Next, the system transactionally executes code within the critical section, without committing results of the transactional execution (step 304).

At the start of transactional execution of the critical section, the program transactionally reads the lock state associated with the critical section to determine if the lock is already held (step 305). If so, the system aborts transactional execution and falls back to a traditional lock-based code path (step 316). Note that if another process acquires the lock during transactional execution of the critical section, the transactional execution of the critical section will be aborted because the initial transactional read of the lock state will be "interfered with" by the lock acquisition operation.

During this transactional execution, the system continually monitors data references made by other threads, and determines if an interfering data access (or other type of failure) takes place during transactional execution (step 306). If not, the system atomically commits all changes made during transactional execution (step 308) and then optionally resumes normal non-transactional execution of the program past the critical section (step 310).

On the other hand, if an interfering data access is detected, the system discards changes made during the transactional execution (step 312). Next, the system reads the TSR to determine whether it is advantageous to attempt to re-execute the critical section (step 313). If so, the system, the system attempts to re-execute the critical section (step 314). If not, the system falls back to a traditional lock-based code path (step 316).

In one embodiment of the present invention, the system attempts to transactionally re-execute the critical section zero, one, two or more times. If these attempts are not successful, the system executes an alternative block of code in normal execution mode. This alternative code may additionally attempt to perform the transaction and will likely have the ability to revert back to the conventional technique of acquiring a lock on the critical section before entering the critical section, and then releasing the lock after leaving the critical section.

Note that an interfering data access can include a store by another thread to a cache line that has been load-marked by the thread. It can also include a load or a store by another thread to a cache line that has been store-marked by the thread.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

Figure 4:
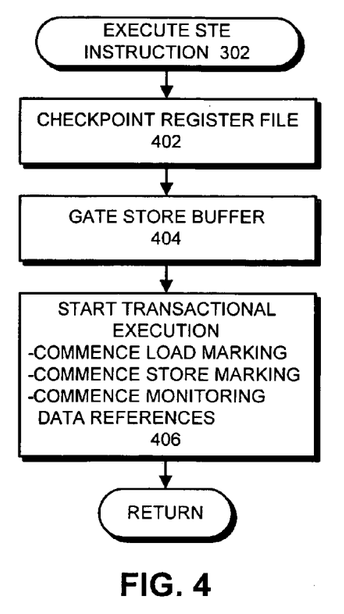
FIG. 4 presents a flow chart illustrating a start transactional execution (STE) operation in accordance with an embodiment of the present invention.

FIG. 4 presents a flow chart illustrating a start transactional execution (STE) operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing thread. In general, the flash copy operation checkpoints enough state to be able to restart the corresponding thread.

At the same time the register file is checkpointed, the STE operation also causes store buffer 112 to become "gated" (step 404). This allows existing entries in store buffer to propagate to the memory sub-system (and to thereby become committed to the architectural state of the processor), but prevents new store buffer entries generated during transactional execution from doing so.

The system then starts transactional execution (step 406), which involves load-marking and store-marking cache lines, if necessary, as well as monitoring data references in order to detect interfering references.

Load-Marking Process

Figure 5:
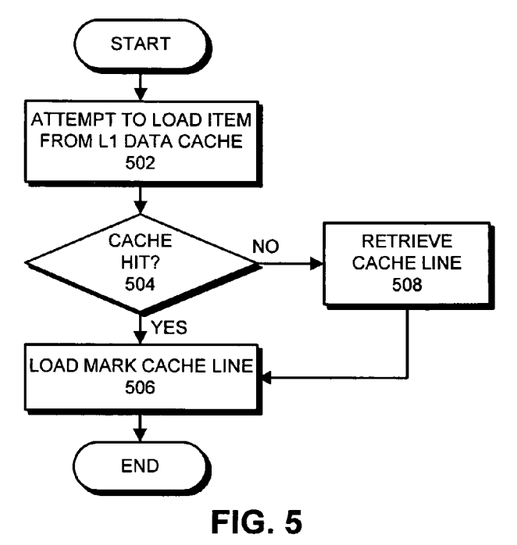
FIG. 5 presents a flow chart illustrating how load-marking is performed during transactional execution in accordance with an embodiment of the present invention.

FIG. 5 presents a flow chart illustrating how load-marking is performed during transactional execution in accordance with an embodiment of the present invention. During transactional execution of a critical section, the system performs a load operation. In performing this load operation if the load operation has been identified as a load operation that needs to be load-marked, the system first attempts to load a data item from L1 data cache 115 (step 502). If the load causes a cache hit, the system "load-marks" the corresponding cache line in L1 data cache 115 (step 506). This involves setting the load-marking bit for the cache line. Otherwise, if the load causes a cache miss, the system retrieves the cache line from further levels of the memory hierarchy (step 508), and proceeds to step 506 to load-mark the cache line in L1 data cache 115.

Store-Marking Process

Figure 6:
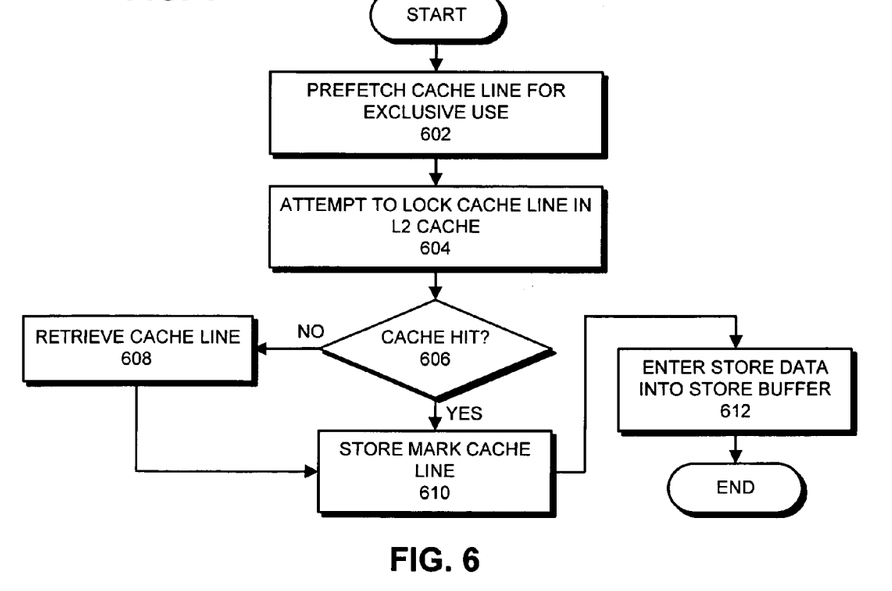
FIG. 6 presents a flow chart illustrating how store-marking is performed during transactional execution in accordance with an embodiment of the present invention.

FIG. 6 presents a flow chart illustrating how store-marking is performed during transactional execution in accordance with an embodiment of the present invention. During transactional execution of a critical section, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 115 (step 604). If the corresponding line is in L2 cache 120 (cache hit), the system "store-marks" the corresponding cache line in L2 cache 120 (step 610). This involves setting the store-marking bit for the cache line. Otherwise, if the corresponding line is not in L2 cache 120 (cache miss), the system retrieves the cache line from further levels of the memory hierarchy (step 608) and then proceeds to step 610 to store-mark the cache line in L2 cache 120.

Next, after the cache line is store-marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store marked by a given thread can be read by other threads. Note that this may cause the given thread to fail while the other threads continue.

Commit Operation

Figure 7:
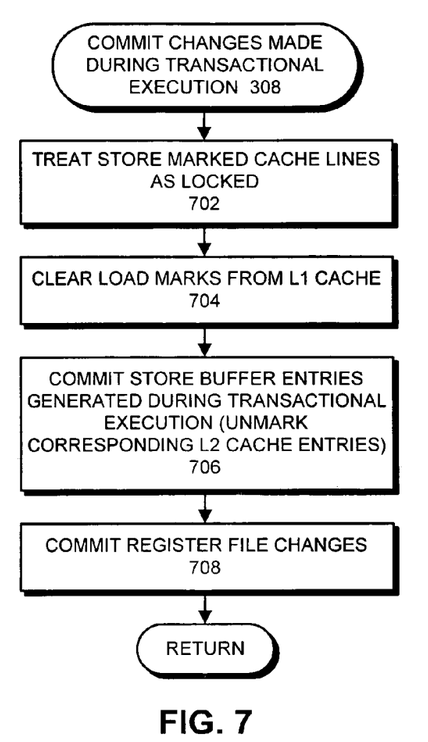
FIG. 7 presents a flow chart illustrating how a commit operation is performed in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by treating store-marked cache lines as though they are locked (step 702). This means other threads that request a store-marked line must wait until the line is no longer locked before they can access the line. This is similar to how lines are locked in conventional caches.

Next, the system clears load-marks from L1 data cache 115 (step 704).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1.

Discarding Changes

Figure 8:
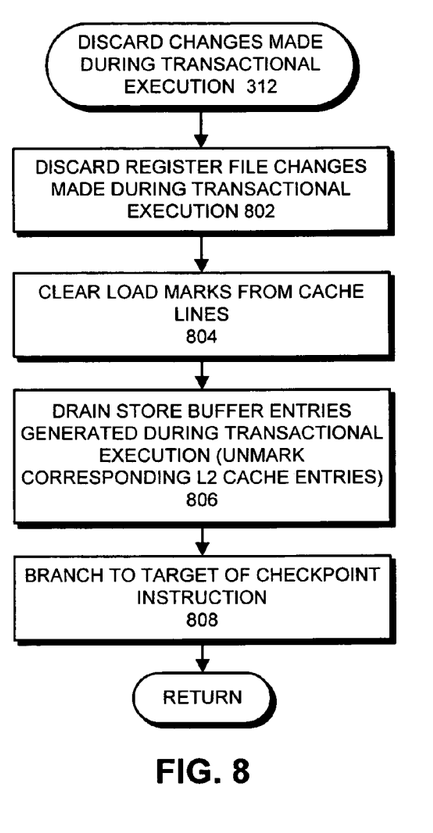
FIG. 8 presents a flow chart illustrating how changes are discarded after transactional execution completes unsuccessfully in accordance with an embodiment of the present invention.

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load-marks from cache lines in L1 data cache 115 (step 804), and drains store buffer entries generated during transactional execution without committing them to the memory hierarchy (step 806). At the same time, the system unmarks corresponding L2 cache lines. Finally, in one embodiment of the present invention, the system branches to a target location specified by the STE instruction (step 808). The code at this target location optionally attempts to re-execute the critical section (as is described above with reference to step 314 of FIG. 1) or takes other action in response to the failure, for example backing off to reduce contention.

Execution Pipeline

Figure 9A:
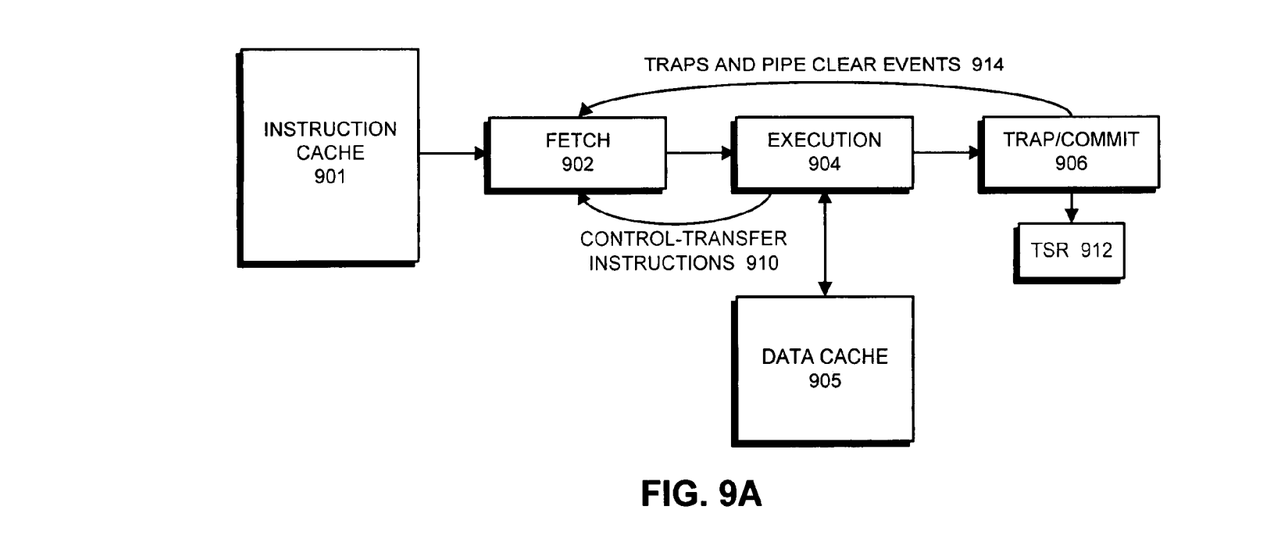
FIG. 9A illustrates an execution pipeline of a processor in accordance with an embodiment of the present invention.

FIG. 9A illustrates an exemplary execution pipeline of a processor in accordance with an embodiment of the present invention. This execution pipeline includes: a fetch unit 902 that fetches instructions to be executed from instruction cache 901; an execution unit 904 that executes instructions which can perform operations on data items within data cache 905; and trap/commit unit 906 that commits the results of the instructions and, if necessary, causes traps.

Note that the normal flow of execution can be interrupted by control-transfer instructions (CTIs) 910, which (when executed by execution unit 904) can cause fetch unit 902 to begin fetching instructions from a branch target.

Also, within trap/commit unit 906, traps and pipe clear events 914 can cause fetch unit 902 to begin fetching instructions from another location, for example to execute trap handling code. When such traps or pipe clear events occur, the system records information in transaction status register (TSR) 912. This information can subsequently be used to determine the reasons for failure of a transaction. This information is described in more detail below with reference to FIG. 9B.

Transactional Status Register

Figure 9B:
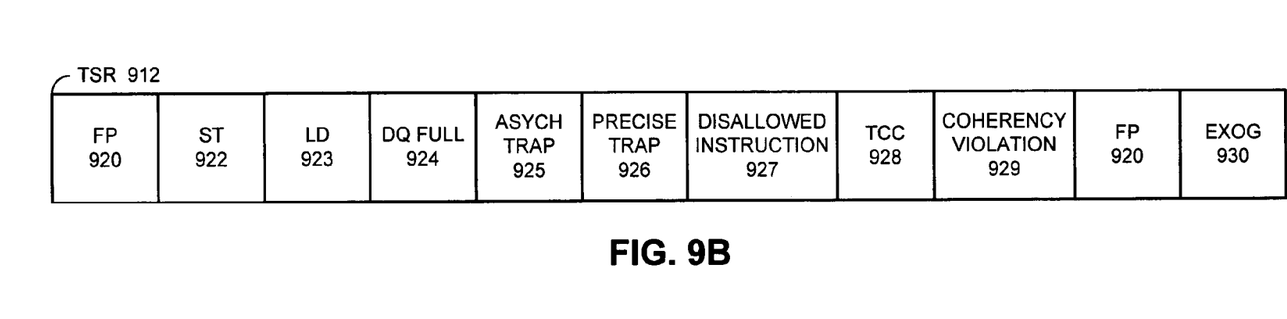
FIG. 9B illustrates an exemplary transactional-status register (TSR) in accordance with an embodiment of the present invention.

FIG. 9B illustrates an exemplary transactional-status register (TSR) 912 in accordance with an embodiment of the present invention. TSR 912 includes: FP flag 920, which indicates whether a floating-point instruction caused the transactional execution to fail; CTI flag 921, which indicates whether a control-transfer instruction (CTI) caused the transactional execution to fail; ST flag 922, which indicates whether a store instruction caused the transactional execution to fail; LD flag 923, which indicates whether a load instruction caused the transactional execution to fail; DQ-full flag 924, which indicates whether a deferred-queue-full condition caused the transactional execution to fail (For a description of a deferred queue, please refer to U.S. patent application Ser. No. 10/686,061, filed 14 Oct. 2003 entitled, "Selectively Deferring the Execution of Instructions with Unresolved Data Dependencies as They Are Issued in Program Order," Attorney Docket No. SUN04-0182, which is hereby incorporated by reference.); asynch-trap flag 925, which indicates whether an asynchronous trap caused the transactional execution to fail; precise-trap flag 926, which indicates whether a precise trap caused the transactional execution to fail; disallowed-instruction flag 927, which indicates whether an instruction disallowed during transactional execution caused the transactional execution to fail; and Tcc flag 928, which indicates whether a special-purpose "fail instruction" caused the transactional execution to fail. Note that using a Tcc instruction to implement the fail instruction is advantageous, because: (1) the use of the condition-code register allows the conditional failure of a transaction; and (2) the Tcc instruction is typically not subject to branch mis-prediction related issues.

TSR 192 also includes a coherency-violation flag 929, which indicates that another process interfered with the transactional execution.

TSR 912 additionally includes an "exogenous flag" 930, which indicates whether the information was recorded during transactional execution or during execution of "exogenous code" from outside of transactional program execution. Recall that the system records information in TSR 912 during traps and pipe clear events 914. However, some of these traps and pipe clear events may take place outside of transactional execution. Hence, it is useful to be able to determine whether TSR 912 was recorded during transaction execution, or while executing exogenous code outside of transactional execution.

In a further variation, if all of entries in TSR 912 are zero, this indicates that recording of the failure information has been disabled or is not supported by the processor.

Example Code

Exemplary code that executes critical section appears in Table 1 below.

TABLE 1

```
chkpt alt_path
ldx   [mutex_addr], %g1
cmp   %g1, %g0      ! mutex is already held if %g1 is nonzero
tne   %xcc, 0       ! fail transaction if mutex is already held
ldx   [counter], %l1
inc   %l1
stx   %l1, [counter]
commit
``` where alt_path contains "safe" code such as what appears in Table 2 below.

TABLE 2

```
mutex_enter(mutex_addr) ! spins until [mutex_addr] == 0, then sets
ldx   [counter], %l1
inc   %l1
stx   %l1, [counter]
mutex_exit(mutex_addr) ! resets [mutex_addr] to 0
```

TSR register 912 can written by hardware on every pipe clear event as is specified by the code in Table 3 below. Note that, after a context switch, this system can set bit 0 of the % tsr, which informs user software that system software ran before the alt_path code was reached.

TABLE 3

```
if (checkpoint feature disabled)
    %tsr[10:0] = 0x0;
else if (! checkpointed_region)
    %tsr[10:0] = 0x1;
else { // checkpointed_region
    %tsr[0]  = 0;
    %tsr[1]  = (coherency violation)    ? 1 : 0;
    %tsr[2]  = (taken Tcc)              ? 1 : 0;
    %tsr[3]  = (disallowed instruction) ? 1 : 0;
    %tsr[4]  = (precise trap)           ? 1 : 0;
    %tsr[5]  = (asynchronous trap)      ? 1 : 0;
    %tsr[6]  = (DQ overflow)            ? 1 : 0;
    %tsr[7]  = (load related)           ? 1 : 0;
    %tsr[8]  = (store related)          ? 1 : 0;
    %tsr[9]  = (CTI related)            ? 1 : 0;
    %tsr[10] = (floating-point related) ? 1 : 0;
}
```

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reporting reasons for failure during transactional execution, comprising:
   while executing a program on a processor, transactionally executing a block of instructions in the program;

if the transactional execution of the block of instructions completes successfully,
  committing changes made during the transactional execution, and
  resuming normal non-transactional execution of the program past the block of instructions; and
if the transactional execution of the block of instructions fails,
  discarding changes made during the transactional execution, and
  whenever a pipe clear operation occurs on the processor, recording failure information indicating why the transactional execution failed;
wherein the failure information contains an "exogenous flag," which indicates whether the information was recorded during transactional execution or during execution of "exogenous code" from outside of transactional program execution.

2. The method of claim 1, wherein if the transactional execution of the block of instructions fails, the method further comprises resuming execution at an address which is specified by an instruction which staffed the transactional execution of the block of instructions.

3. The method of claim 1, wherein if the transactional execution of the block of instructions fails, the method further comprises:
  determining from the failure information whether it is advantageous to re-execute the block of instructions; and
  if so, re-executing the block of instructions.

4. The method of claim 1, wherein recording the failure information involves recording the failure information in a transaction-status register (TSR).

5. The method of claim 4, wherein information contained in the TSR specifies whether recording of the failure information has been disabled or is not supported by the processor.

6. The method of claim 1, wherein the failure information includes one or more of the following:
  a flag indicating that a coherency violation caused the transactional execution to fail, wherein the coherency violation indicates that another process interfered with the transactional execution;
  a flag indicating whether a fail instruction caused the transactional execution to fail;
  a flag indicating whether an instruction disallowed during transactional execution caused the transactional execution to fail;
  a flag indicating whether a precise trap caused the transactional execution to fail;
  a flag indicating whether an asynchronous trap caused the transactional execution to fail;
  a flag indicating whether a deferred-queue-full condition caused the transactional execution to fail;
  a flag indicating whether a load instruction caused the transactional execution to fail;
  a flag indicating whether a store instruction caused the transactional execution to fail;
  a flag indicating whether a control-transfer instruction (CTI) caused the transactional execution to fail; and
  a flag indicating whether a floating-point instruction caused the transactional execution to fail.

7. The method of claim 6, wherein the fail instruction is a variation of a trap instruction which causes the transactional execution to fail.

8. An apparatus that reporting reasons for failure during transactional execution, comprising:
  a transactional-execution mechanism within a processor, wherein the transactional-execution mechanism is configured to transactionally execute a block of instructions in a program;
  wherein if the transactional execution of the block of instructions completes successfully, the transactional-execution mechanism is configured to,
    commit changes made during the transactional execution, and to
    resume normal non-transactional execution of the program past the block of instructions; and
  wherein if the transactional execution of the block of instructions fails, the transactional-execution mechanism is configured to,
    discard changes made during the transactional execution, and
    whenever a pipe clear operation occurs on the processor, to record failure information indicating why the transactional execution failed;
  wherein the failure information contains an "exogenous flag," which indicates whether the information was recorded during transactional execution or during execution of "exogenous code" from outside of transactional program execution.

9. The apparatus of claim 8, wherein if the transactional execution of the block of instructions fails, the transactional-execution mechanism is configured to resume execution at an address which is specified by an instruction which staffed the transactional execution of the block of instructions.

10. The apparatus of claim 8, wherein if the transactional execution of the block of instructions fails, the transactional-execution mechanism is configured to:
  determine from the failure information whether it is advantageous to re-execute the block of instructions; and
  if so, to re-execute the block of instructions.

11. The apparatus of claim 8, wherein the transactional-execution mechanism is configured to record the failure information in a transaction-status register (TSR).

12. The apparatus of claim 11, wherein information contained in the TSR specifies whether recording of the failure information has been disabled or is not supported by the processor.

13. The apparatus of claim 8, wherein the failure information includes one or more of the following:
  a flag indicating that a coherency violation caused the transactional execution to fail, wherein the coherency violation indicates that another process interfered with the transactional execution;
  a flag indicating whether a fail instruction caused the transactional execution to fail;
  a flag indicating whether an instruction disallowed during transactional execution caused the transactional execution to fail;
  a flag indicating whether a precise trap caused the transactional execution to fail;
  a flag indicating whether an asynchronous trap caused the transactional execution to fail;
  a flag indicating whether a deferred-queue-full condition caused the transactional execution to fail;
  a flag indicating whether a load instruction caused the transactional execution to fail;
  a flag indicating whether a store instruction caused the transactional execution to fail;
  a flag indicating whether a control-transfer instruction (CTI) caused the transactional execution to fail; and
  a flag indicating whether a floating-point instruction caused the transactional execution to fail.

14. The apparatus of claim 13, wherein the fail instruction is a variation of a trap instruction which causes the transactional execution to fail.

15. A computer system that reports reasons for failure during transactional execution, comprising:
    a processor;
    a memory; and
    a transactional-execution mechanism within the processor, wherein the transactional-execution mechanism is configured to transactionally execute a block of instructions in a program;
    wherein if the transactional execution of the block of instructions completes successfully, the transactional-execution mechanism is configured to,
        commit changes made during the transactional execution, and to
        resume normal non-transactional execution of the program past the block of instructions; and
    wherein if the transactional execution of the block of instructions fails, the transactional-execution mechanism is configured to,
        discard changes made during the transactional execution, and
        whenever a pipe clear operation occurs on the processor, to record failure information indicating why the transactional execution failed;
    wherein the failure information contains an "exogenous flag," which indicates whether the information was recorded during transactional execution or during execution of "exogenous code" from outside of transactional program execution.

16. The computer system of claim 15, wherein if the transactional execution of the block of instructions fails, the transactional-execution mechanism is configured to resume execution at an address which is specified by an instruction which started the transactional execution of the block of instructions.

17. The computer system of claim 15, wherein if the transactional execution of the block of instructions fails, the transactional-execution mechanism is configured to:
    determine from the failure information whether it is advantageous to re-execute the block of instructions; and
    if so, to re-execute the block of instructions.

18. The computer system of claim 15, wherein the transactional-execution mechanism is configured to record the failure information in a transaction-status register (TSR).

* * * * *

UNITED STATES PATENT AND TRADEMARK OFFICE
CERTIFICATE OF CORRECTION

| | |
|---|---|
| PATENT NO. | : 7,617,421 B2 |
| APPLICATION NO. | : 11/495452 |
| DATED | : November 10, 2009 |
| INVENTOR(S) | : Paul Caprioli et al. |

It is certified that error appears in the above-identified patent and that said Letters Patent is hereby corrected as shown below:

In claim 2 (at column 11, line 22), please replace the word "staffed" with the word --started--.

In claim 9 (at column 12, line 28), please replace the word "staffed" with the word --started--.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,617,421 B2
APPLICATION NO. : 11/495452
DATED : November 10, 2009
INVENTOR(S) : Caprioli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Nineteenth Day of October, 2010

David J. Kappos
*Director of the United States Patent and Trademark Office*